United States Patent
Suzuki

(10) Patent No.: US 10,926,617 B2
(45) Date of Patent: Feb. 23, 2021

(54) VEHICLE POWER CABLE SYSTEM

(71) Applicant: HONDA MOTOR CO., LTD., Tokyo (JP)

(72) Inventor: Takanori Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 16/566,329

(22) Filed: Sep. 10, 2019

(65) Prior Publication Data
US 2020/0079202 A1  Mar. 12, 2020

(30) Foreign Application Priority Data
Sep. 12, 2018 (JP) .............................. JP2018-170797

(51) Int. Cl.
| | |
|---|---|
| B60K 1/04 | (2019.01) |
| B62D 21/15 | (2006.01) |
| H02K 11/00 | (2016.01) |
| H02K 7/00 | (2006.01) |

(52) U.S. Cl.
CPC .............. B60K 1/04 (2013.01); B62D 21/152 (2013.01); H02K 7/006 (2013.01); H02K 11/0094 (2013.01); *B60K 2001/0438* (2013.01)

(58) Field of Classification Search
CPC ........ B60K 1/04; B62D 21/152; H02K 7/006; H02K 11/0094
See application file for complete search history.

(56) References Cited

U.S. PATENT DOCUMENTS

| | | | |
|---|---|---|---|
| 8,012,620 B2 * | 9/2011 | Takasaki | ................ B60R 16/04 429/100 |
| 10,205,316 B1 * | 2/2019 | Jojima | ................ H02M 3/1588 |

(Continued)

FOREIGN PATENT DOCUMENTS

| | | |
|---|---|---|
| JP | 2009-227083 A | 10/2009 |
| JP | 2012-196986 A | 10/2012 |

(Continued)

OTHER PUBLICATIONS

Mar. 3, 2020, Japanese Office Action issued for related JP Application No. 2018-170797.

*Primary Examiner* — John D Walters
*Assistant Examiner* — James J Triggs
(74) *Attorney, Agent, or Firm* — Paratus Law Group, PLLC

(57) ABSTRACT

A vehicle includes an electric equipment and a cable connected to the electric equipment, a cable connection portion of the electric equipment is disposed on one side of the vehicle in a front-rear direction, and the cable connection portion is disposed closer to the other side in the front-rear direction than an end surface on the one side in the front-rear direction of the electric equipment and at a position lower than an uppermost surface of the electric equipment. The cable includes a first wire portion extending from the cable connection portion to one side of the vehicle in the width direction; a second wire portion continuously extending to the other side in the front-rear direction, and a third wire portion continuously extending to the other side in the width direction, and the cable is disposed along an upper surface of the electric equipment.

10 Claims, 9 Drawing Sheets

(56) References Cited

U.S. PATENT DOCUMENTS

| | | | |
|---|---|---|---|
| 2011/0114398 A1* | 5/2011 | Bianco | B60K 1/04 |
| | | | 180/65.1 |
| 2012/0235471 A1 | 9/2012 | Tanahashi et al. | |
| 2014/0151138 A1* | 6/2014 | Kitami | B60L 3/0061 |
| | | | 180/65.21 |
| 2015/0195960 A1* | 7/2015 | Seki | B62D 21/17 |
| | | | 361/690 |
| 2017/0232913 A1* | 8/2017 | Fukazu | B60R 16/0215 |
| | | | 307/10.1 |
| 2018/0175350 A1* | 6/2018 | Goitsuka | B60L 58/26 |

FOREIGN PATENT DOCUMENTS

| | | |
|---|---|---|
| JP | 2013-103583 A | 5/2013 |
| JP | 2016-037091 A | 3/2016 |
| WO | WO 2013/073491 A1 | 5/2013 |
| WO | WO 2013/133151 A1 | 9/2013 |

* cited by examiner

VEHICLE POWER CABLE SYSTEM

CROSS-REFERENCE TO RELATED APPLICATIONS

This application is based on and claims priority under 35 USC 119 from Japanese Patent Application No. 2018-170797 filed on Sep. 12, 2018.

TECHNICAL FIELD

The present invention relates to a vehicle equipped with a driving device unit including an electric motor and an electric motor control device configured to control the electric motor.

BACKGROUND ART

In the electric vehicle of JP-A-2009-227083, an electric motor is disposed in a rear space of a vehicle and a battery is disposed under the floor. According to JP-A-2009-227083, it is possible to prevent the electric motor and the battery from violently colliding with each other at the time of front or rear collision of the electric vehicle.

SUMMARY OF INVENTION

However, Patent Literature 1 does not disclose an arrangement of a cable, and there is a room for improvement in protecting the cable and a cable connection portion which are wired in a narrow space.

An aspect of the present invention provides a vehicle capable of protecting a cable and a cable connection portion from a load in a front-rear direction at a time of a collision of the vehicle or the like.

An embodiment of the present invention relates to a vehicle includes:
an electric equipment; and
a cable connected to the electric equipment, and
a cable connection portion of the electric equipment is disposed on one side of the vehicle in a front-rear direction, and
the cable connection portion is disposed at a position closer to the other side in the front-rear direction than an end surface on the one side in the front-rear direction of the electric equipment and lower than an uppermost surface of the electric equipment, and
the cable includes, in a top view,
a first wire portion extending from the cable connection portion to one side of the vehicle in a width direction of the vehicle,
a second wire portion continuously extending from the first wire portion to the other side in the front-rear direction, and
a third wire portion continuously extending from the second wire portion to the other side in the width direction, and
the cable is disposed along an upper surface of the electric equipment.

Advantageous Effects of Invention

According to the above embodiment of the present invention, it is possible to protect the cable and the cable connection portion from a load in the front-rear direction at the time of a collision of the vehicle or the like.

DESCRIPTION OF EMBODIMENTS

Figure 1:
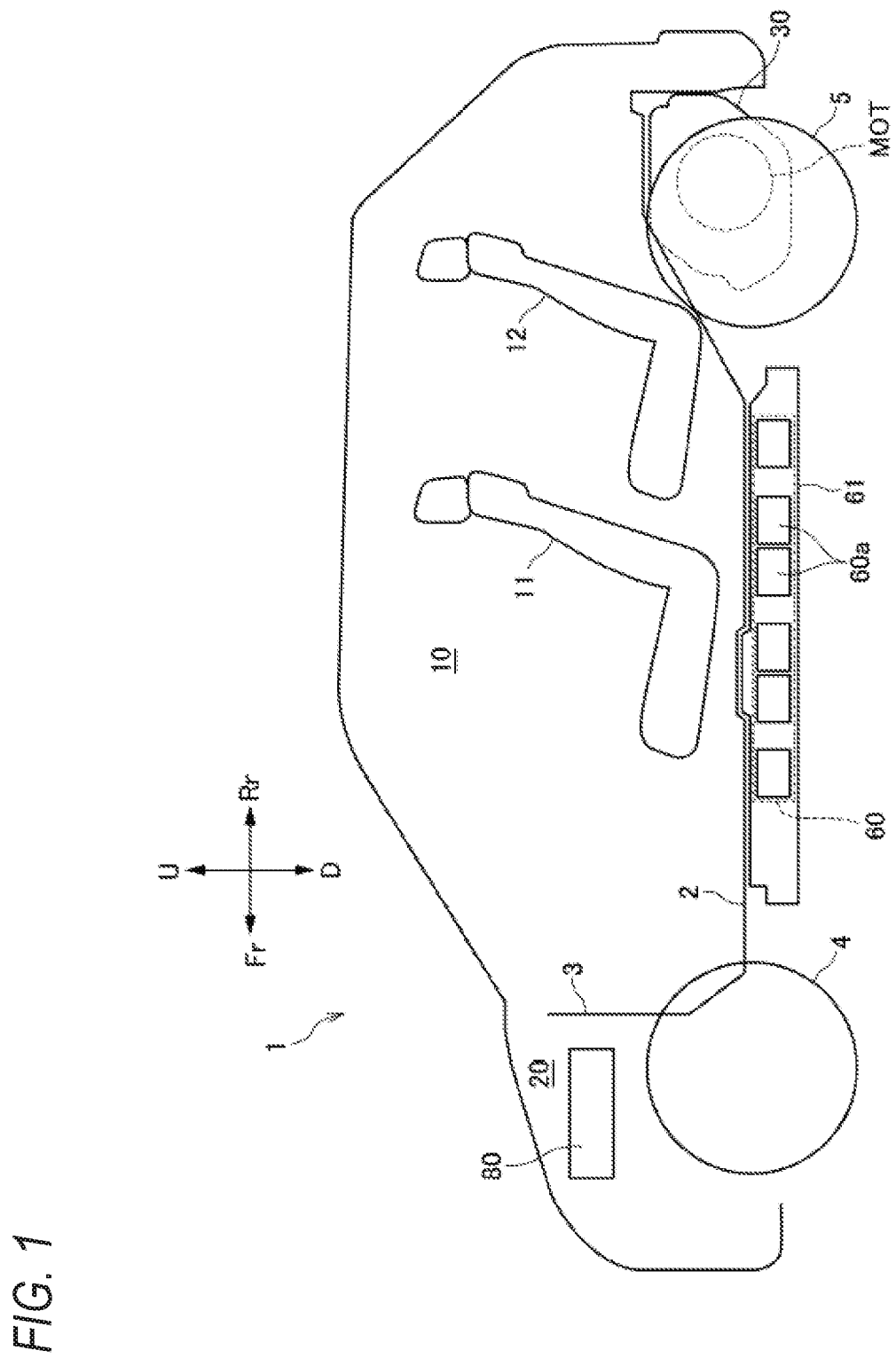
FIG. 1 is a schematic side view showing an overall structure of a vehicle according to an embodiment of the present invention.

Hereinafter, a vehicle according to an embodiment of the present invention will be described with reference to the drawings. Incidentally, the drawings should be seen based on a direction of a reference numeral. In the following description, front, rear, left, right, upper, and lower directions are described according a view from an operator. In the drawings, a front side of the vehicle is denoted by Fr, a rear side is denoted by Rr, a left side is denoted by L, a right side is denoted by IR an upper side is denoted by U, and a lower side is denoted by D.

[Overall Structure of Vehicle]

Figure 2:
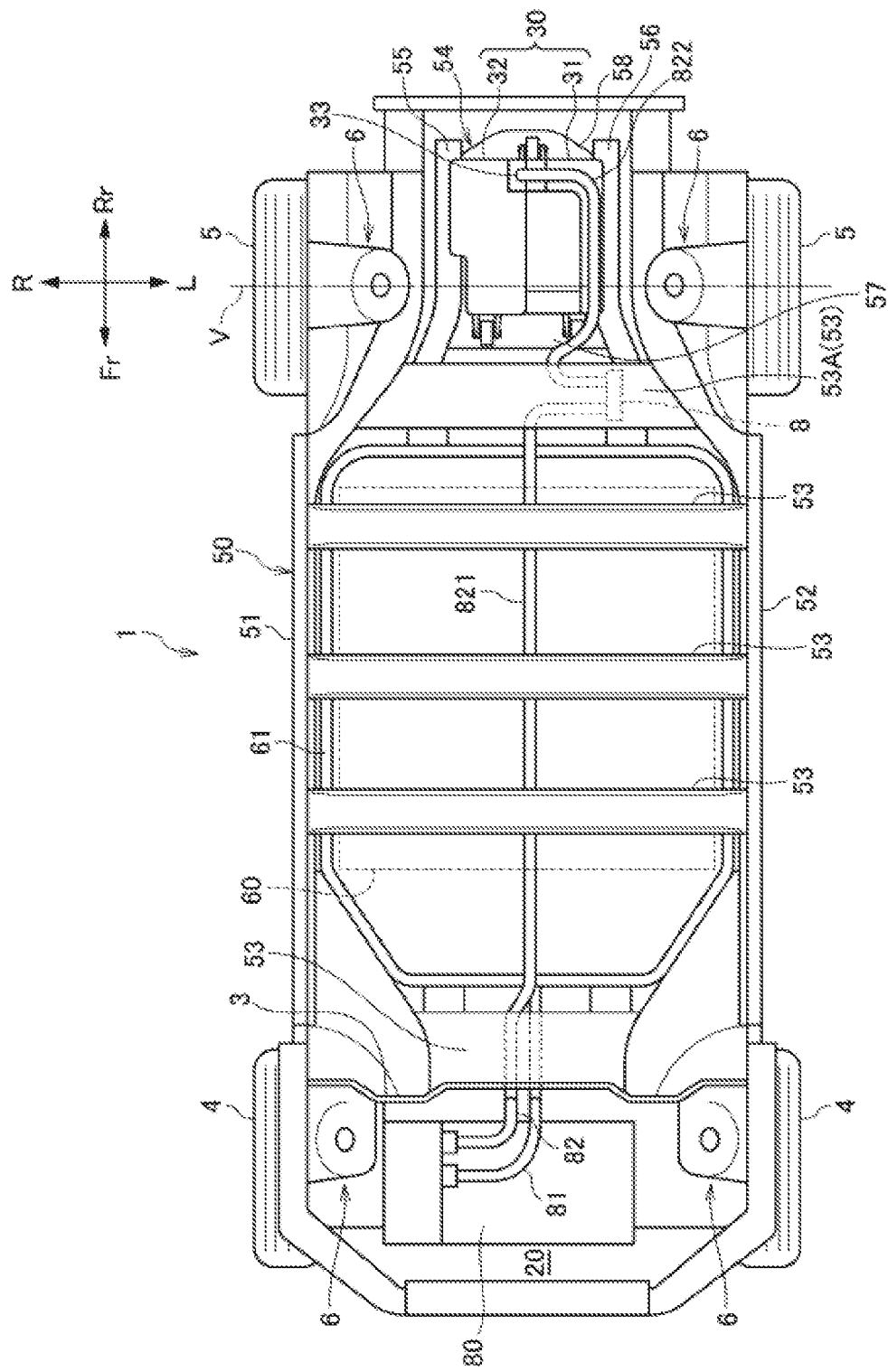
FIG. 2 is a plan view showing an underfloor structure of the vehicle of FIG. 1.

As shown in FIGS. 1 and 2, a vehicle 1 according to an embodiment of the present invention is formed by a vehicle interior 10 and a front room 20 in front of the vehicle interior 10, which are defined by a floor panel 2 and a dash panel 3. Front seats 11 and rear seats 12 are provided in the vehicle interior 10. A driving device unit 30 as an electric equipment is provided below the floor panel 2 behind the rear seats 12. The driving device unit 30 drives left and right rear wheels 5. That is, in the vehicle 1, the left and right rear wheels 5 are driving wheels, and left and right front wheels 4 are driven wheels. The front wheels 4 and the rear wheels 5 are supported by a vehicle body frame 50 via suspensions (not shown) supported by respective suspension support portions 6.

A battery 60 including a plurality of battery modules 60a is disposed below the vehicle interior 10. The battery 60 is accommodated in a battery case 61 and disposed below the floor panel 2.

The vehicle body frame 50 includes a pair of left and right side members 51, 52 extending in a front-rear direction, a plurality of cross members 53 extending in a left-right direction and connecting the side members 51, 52, and a sub-frame 54 having a rectangular shape so as to surround the driving device unit 30. The sub-frame 54 includes a pair of sub-side members 55, 56 supported by the pair of side members 51, 52, and a front frame member 57 and a rear frame member 58 connecting the pair of sub-side members 55, 56.

[Driving Device Unit]

Figure 4:
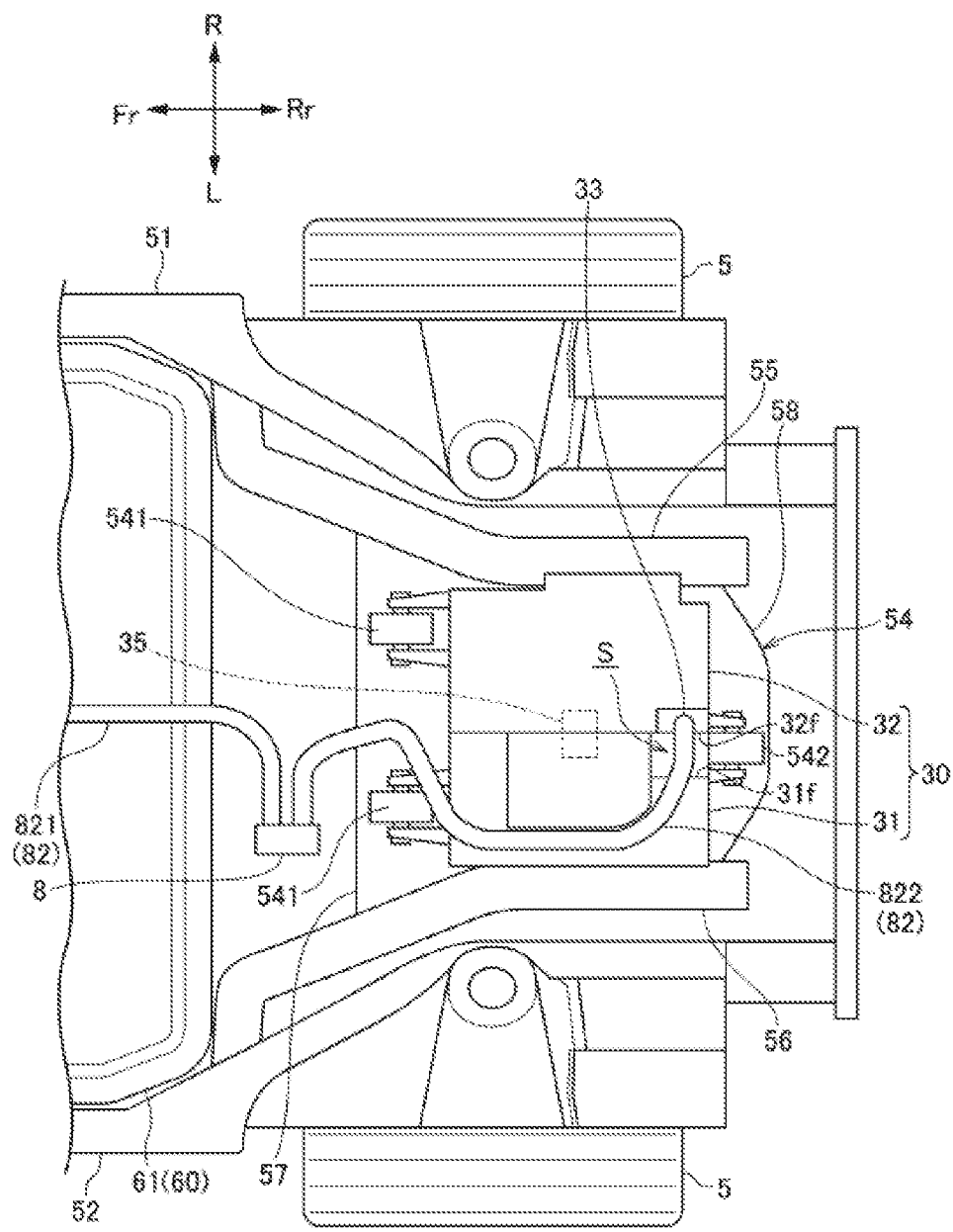
FIG. 4 is a plan view of a driving device unit including an electric equipment and a periphery thereof of the vehicle of FIG. 1.
Figure 5:
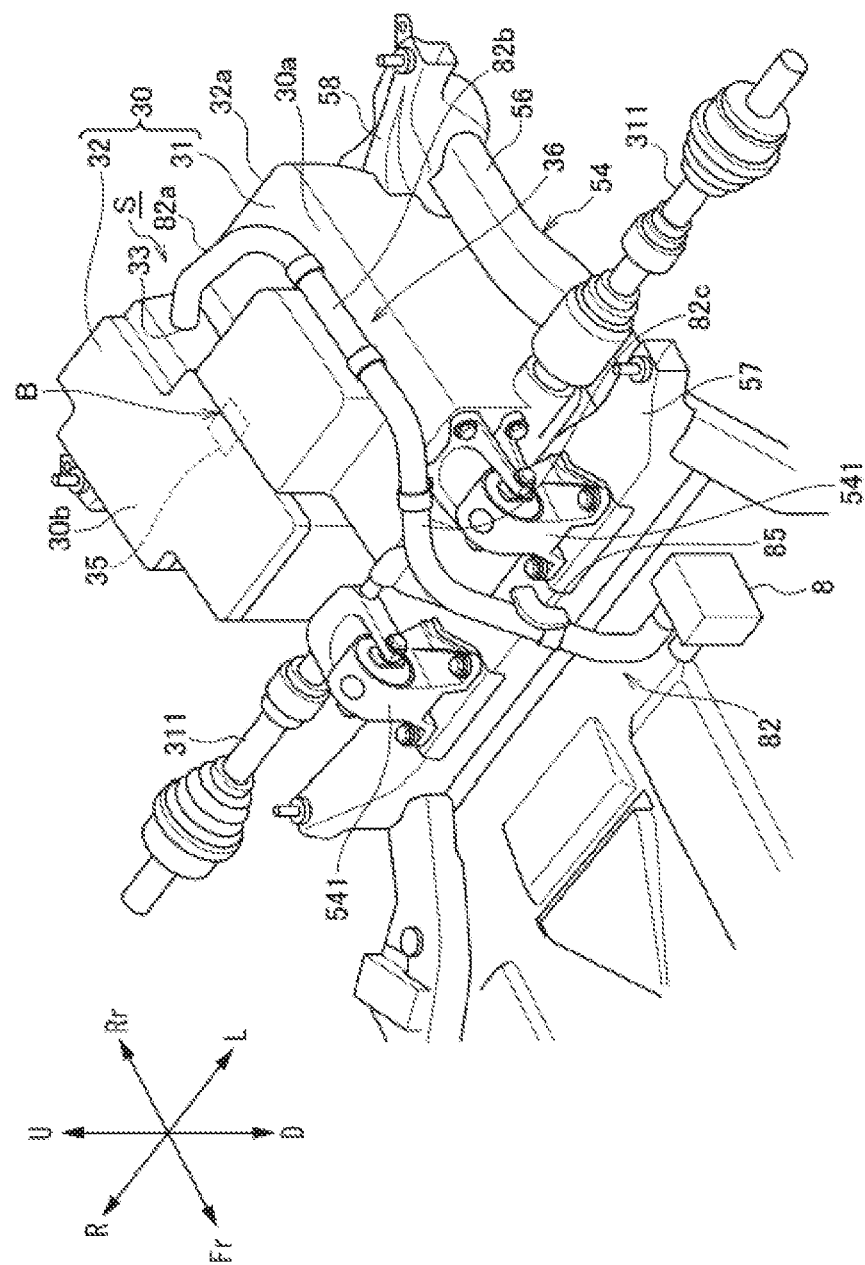
FIG. 5 is a perspective view of the driving device unit and the periphery thereof of the vehicle of FIG. 1.

As shown in FIGS. 4 and 5, the driving device unit 30 is fixed to the rear frame member 58 via a rear mounting portion 542, and is fixed to the front frame member 57 via a pair of front mounting portions 541. The driving device unit 30 includes a drive device 31 which accommodates a motor MOT as an electric motor and a power control unit (PCU) 32 as an electric motor control unit configured to control the motor MOT. The drive device 31 is provided with a transmission (not shown), and torque of the motor MOT is transmitted to output shafts 311 via the transmission, and is transmitted from the output shafts 311 to the rear wheels 5. The drive device 31 and the PCU 32 are arranged side by side in a width direction of the vehicle 1 in a top view.

Figure 6:
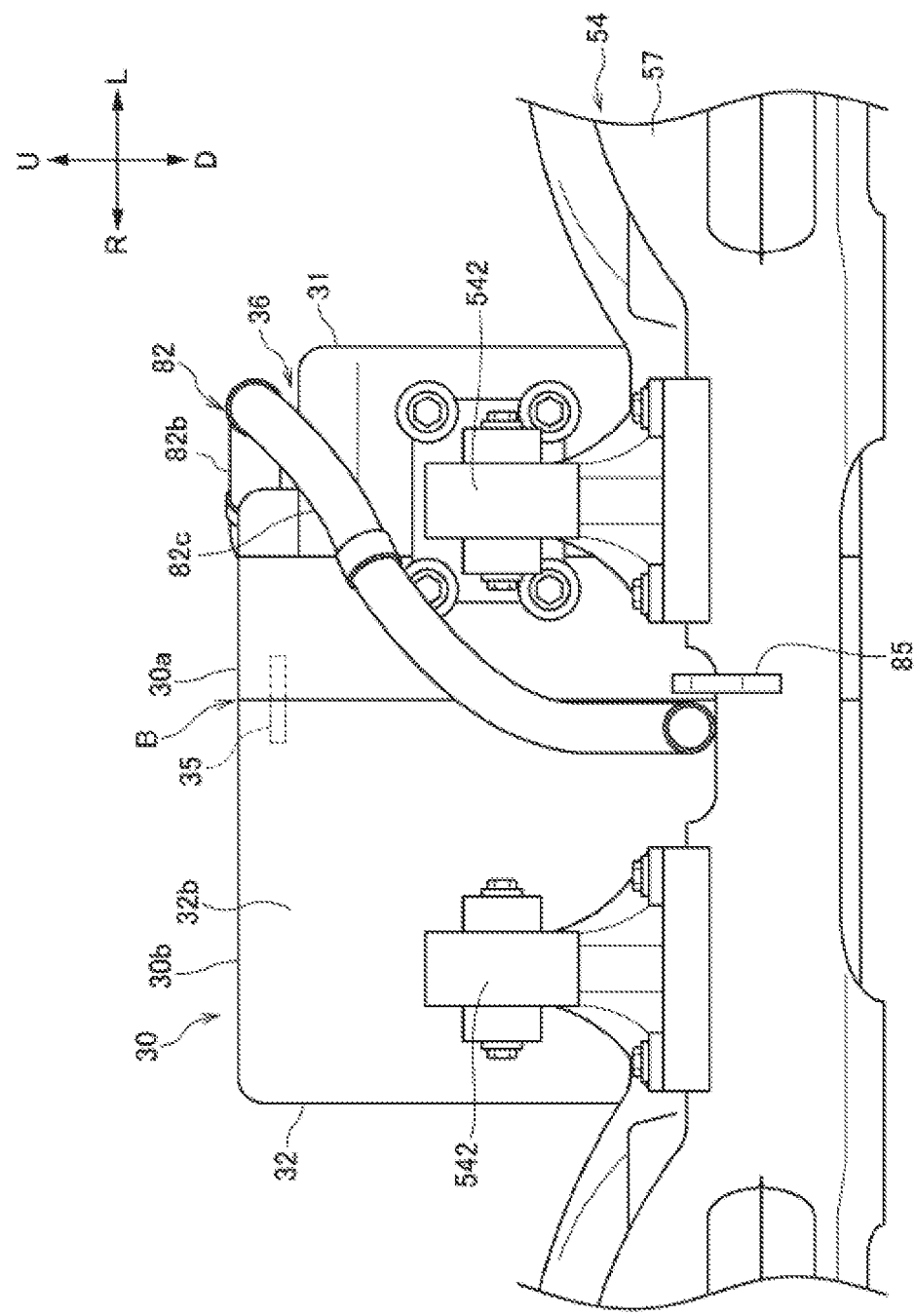
FIG. 6 is a front view of the driving device unit and the periphery thereof of the vehicle of FIG. 1.
Figure 7:
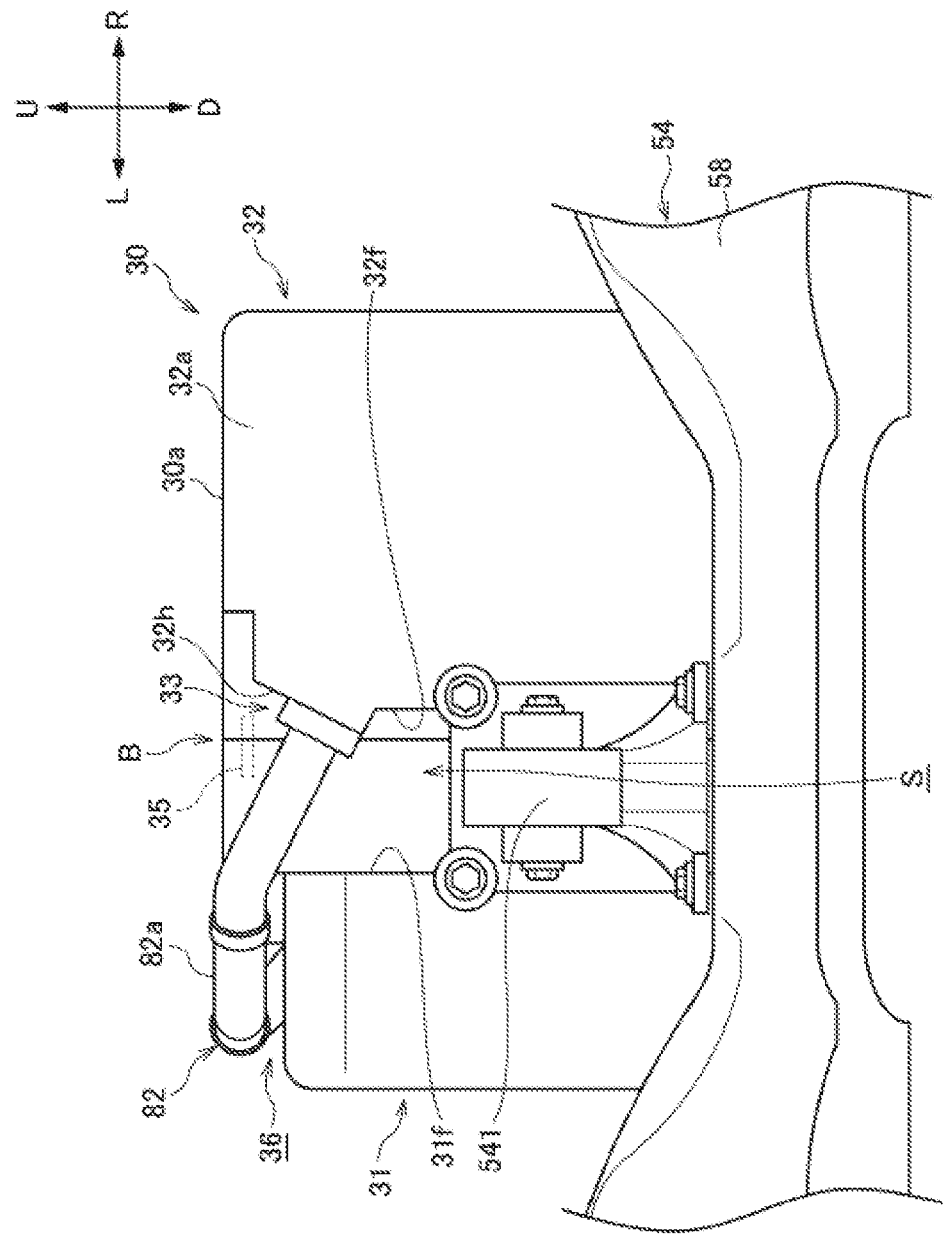
FIG. 7 is a back view of the driving device unit of and the periphery thereof the vehicle of FIG. 1.

Referring also to FIGS. 6 and 7, electric circuits inside the drive device 31 and the PCU 32 are electrically connected by a bus bar 35 as an electrical connection portion. In addition, the drive device 31 and the PCU 32 are behind the bus bar 35, and facing surfaces 31f, 32f of the drive device 31 and the PCU 32 face each other via a gap portion S in the width direction.

[Cable Arrangement]

Figure 3:
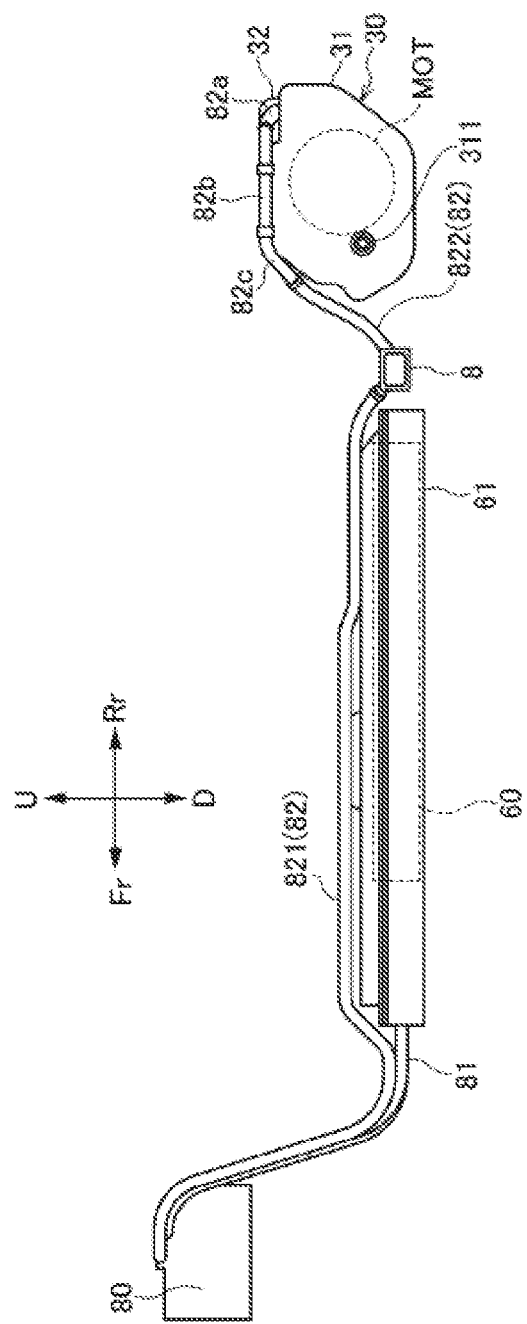
FIG. 3 is a side view illustrating a cable arrangement of the vehicle of FIG. 1.

As shown in FIGS. 2 and 3, the front room 20 is provided with a junction box 80 connected to a charging port (not shown) provided at an upper portion of a tip end of the vehicle 1. The junction box 80 is connected to the battery 60 via a battery cable 81, and connected to the PCU 32 via a PCU cable 82. The PCU cable 82 has a first cable 821 extending from the junction box 80 and a second cable 822 extending from the PCU 32, the first cable 821 and the second cable 822 are connected to each other via a joint box 8 fixed to a lower surface of the cross member 53 (hereinafter, the cross member 53 is referred to as a support cross member 53A) positioned between the battery 60 and the driving device unit 30.

The PCU cable 82 is disposed between the floor panel 2 and the battery 60, so that the PCU cable 82 is protected from flying stones or the like.

[Cable Connection Portion]

As shown in FIGS. 5 to 9, on a rear side of the vehicle 1, a cable connection portion 33 of the PCU 32 is disposed on a front side (inner side) of a rear surface 32a on a rear side of the PCU 32 and at a position lower than the uppermost surface 30b of the PCU 32 positioned at the highest position of the upper surface 30a of the driving device unit 30. In a top view, the PCU cable 82 includes a first wire portion 82a extending leftward in the width direction of the vehicle 1 from the cable connection portion 33, a second wire portion 82b continuously extending forward in the front-rear direction from the first wire portion 82a, and a third wire portion 82c continuously extending rightward in the width direction from the second wire portion 82b, and is disposed along the upper surface 30a of the drive device 31.

As described above, since the cable connection portion 33 disposed on the rear side of the vehicle 1 is disposed on the front side of the rear surface 32a of the PCU 32 and at the position lower than the uppermost surface 30b of the PCU 32, it is possible to avoid a load from a rear side where an impact is large from directly acting on the cable connection portion 33 at the time of a collision of the vehicle 1 or the like.

As shown in FIGS. 5 and 7, the cable connection portion 33 is provided on the PCU 32, and is disposed at a boundary portion B between the drive device 31 and the PCU 32 in a top view. More specifically, behind the bus bar 35, the cable connection portion 33 is disposed on the facing surface 32f of the PCU 32 in the gap portion S formed between the facing surfaces 31f, 32f of the drive device 31 and the PCU 32. Since the cable connection portion 33 is surrounded by a rigid body in three directions, damage at the time of a collision of the vehicle 1 or the like can be avoided. Further, since the cable connection portion 33 is positioned at a distal side farther away from the vehicle interior 10 than the bus bar 35, even if the PCU cable 82 is detached from the cable connection portion 33 at the time of a collision of the vehicle 1 or the like, an influence on the vehicle interior 10 can be reduced.

The facing surface 32f of the PCU 32 includes an inclined surface 32h inclined downward toward the facing surface 31f of the drive device 31, and the cable connection portion 33 is disposed on the inclined surface 32h. The cable connection portion 33 is disposed on the inclined surface 32h formed on the facing surface 32f of the PCU 32, so that the PCU cable 82 can be connected from diagonally above, and a connection work of the PCU cable 82 can be facilitated.

As shown in FIG. 4, the cable connection portion 33 is disposed on a front side of the rear mounting portion 542. Since the cable connection portion 33 of the driving device unit 30 disposed on the rear side of the vehicle 1 is disposed on the front side of the rear mounting portion 542, the cable connection portion 33 is protected by the rear mounting portion 542 when a load is input from the rear side where an influence on the driving device unit 30 is relatively large.

The cable connection portion 33 is disposed in a vicinity of the rear mounting portion 542 in the width direction of the vehicle 1, in other words, the cable connection portion 33 and the rear mounting portion 542 are arranged side by side in an upper-lower direction. Accordingly, by providing the cable connection portion 33 at a position close to the rear mounting portion 542, a displacement of the cable connection portion 33 at the time of turning of the vehicle is reduced, and a stress acting on the cable connection portion 33 is reduced.

[PCU Cable]

The PCU cable 82 connected to the cable connection portion 33 has substantially U-shaped in a top view by the first wire portion 82a, the second wire portion 82b, and the third wire portion 82c. Therefore, even if a load acts in the front-rear direction at the time of a collision of the vehicle 1 or the like, a deflection tolerance of the PCU cable 82 can be ensured to be large. Accordingly, the PCU cable 82 and the cable connection portion 33 can be protected from the load in the front-rear direction at the time of a collision of the vehicle 1 or the like. Further, since the first wire portion 82a and the third wire portion 82c of the PCU cable 82 are respectively positioned on a distal side of the vehicle interior 10 and a proximal side of the vehicle interior 10 with the bus bar 35 interposed therebetween, the deflection tolerance of the PCU cable 82 can be ensured to be larger.

Figure 8:
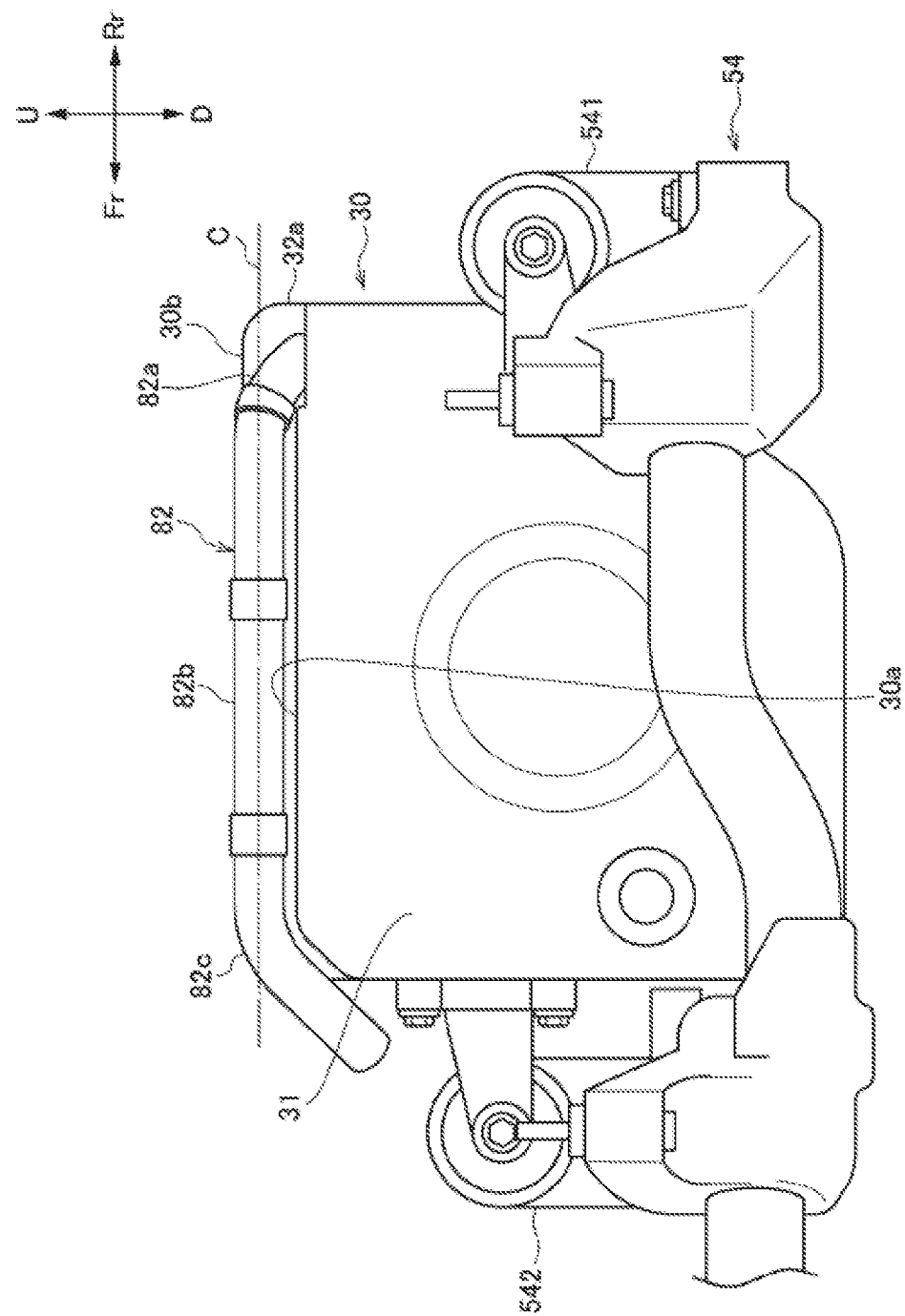
FIG. 8 is a left side view of the driving device unit and the periphery thereof of the vehicle of FIG. 1.
Figure 9:
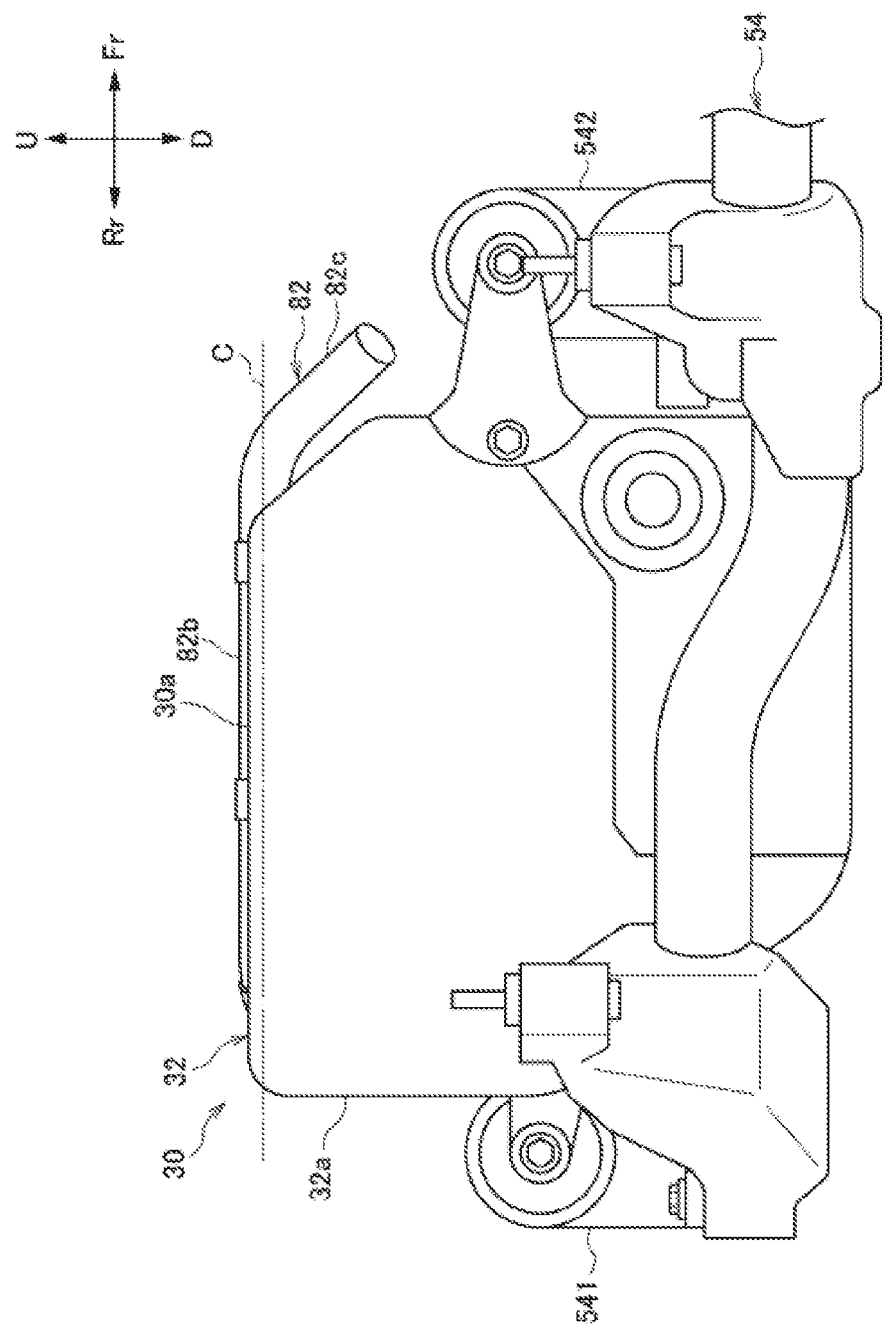
FIG. 9 is a right side view of the driving device unit and the periphery thereof of the vehicle of FIG. 1.

As shown in FIGS. 8 and 9, a center line C of the PCU cable 82 is positioned at a lower portion than the uppermost surface 30b of the PCU 32. By the configuration, a protrusion of the PCU cable 82 in a height direction can be suppressed or reduced, and the PCU cable 82 and the cable connection portion 33 can be protected more reliably.

As shown in FIGS. 6 to 8, the upper surface 30a of the drive device 31 has a notched step portion 36 at a left end of the vehicle 1 in the width direction, and the second wire portion 82b of the PCU cable 82 is disposed at the step portion 36. The second wire portion 82b is disposed at the step portion 36 formed on the upper surface of the drive device 31 in this manner, so that the protrusion of the PCU cable 82 in the height direction can be suppressed or reduced, and damage to the PCU cable 82 due to being in contact with peripheral devices or being pinched by peripheral devices at the time of a collision of the vehicle 1 can be suppressed.

As shown in FIGS. 5 and 6, the third wire portion 82c of the PCU cable 82 extends between the pair of front mounting portions 541 to the joint box 8. According to the configuration, since the third wire portion 82c of the PCU cable 82 is disposed in a space formed by the front frame member 57 and the pair of front mounting portions 541 of the sub-frame 54, the PCU cable 82 can be protected more reliably.

In the vicinity of the front mounting portions 541, a cable protector 85 is provided so as to cover at least a portion of the third wire portion 82c from the sub-frame 54 in a side view. According to the configuration, a survival space of the PCU cable 82 can be secured by the cable protector 85 at the time of a collision of the vehicle 1 or the like.

Returning to FIG. 2, the PCU cable 82 extends in the front-rear direction across a virtual line V connecting the suspension support portions 6 supporting the suspensions of the left and right rear wheels 5. According to the configuration, although the PCU cable 82 is disposed in the vicinity of the rear wheels 5, because the PCU cable 82 is disposed along the upper surface 30a of the driving device unit 30 disposed below the floor panel 2 so as to be covered by the floor panel 2, the PCU cable 82 can be protected from splashing water or foreign substances such as flying stones.

The above-described embodiment can be appropriately modified, improved, or the like. For example, although the drive device 31 provided with the transmission is illustrated in the above-described embodiment, the present invention is not limited thereto, and the drive device 31 not provided with the transmission may be used.

For example, in the above-described embodiment, the cable connection portion 33 of the PCU 32 disposed behind the vehicle 1 is disposed on the rear side of the PCU 32 and on the front side (inner side) of the rear surface 32a on the rear side of the PCU 32, but the PCU 32 may be disposed in the front room 20 of the vehicle 1, the cable connection portion 33 of the PCU 32 may be disposed on a front side of the PCU 32 and on a rear side (inner side) of a front surface 32b of the PCU 32.

At least the following matters are described in the present specification. Components or the like corresponding to the above-described embodiment are shown in parentheses, but the present invention is not limited thereto.

(1) A vehicle (vehicle 1) includes:
an electric equipment (driving device unit 30); and
a cable (PCU cable 82) connected to the electric equipment,
wherein a cable connection portion of the electric equipment is disposed on one side (rear side) of the vehicle in a front-rear direction,
wherein the cable connection portion is disposed closer to the other side (front side) in the front-rear direction than an end surface (rear surface 32a) on the one side in the front-rear direction of the electric equipment and at a position lower than an uppermost surface (uppermost surface 30b) of the electric equipment,
wherein the cable includes, in a top view,
a first wire portion (first wire portion 82a) extending from the cable connection portion to one side (left side) of the vehicle in a width direction,
a second wire portion (second wire portion 82b) continuously extending from the first wire portion to the other side in the front-rear direction, and a third wire portion (third wire portion 82c) continuously extending from the second wire portion to the other side (right side) in the width direction, and
the cable is disposed along an upper surface (upper surface 30a) of the electric equipment.

According to (1), since the cable connection portion disposed on one side of the vehicle in the front-rear direction is disposed on the other side in the front-rear direction from the end surface on the one side of the electric equipment and at the position lower than the uppermost surface of the electric equipment, it is possible to avoid a load from one side where an impact is large from directly acting on the cable connection portion at the time of a collision of the vehicle or the like. In addition, since the cable has a substantially U shape in a top view by the first to third wire portions, even if a load acts in the front-rear direction at the time of a collision of the vehicle or the like, a deflection tolerance of the cable can be ensured to be large. As a result, the cable and the cable connection portion can be protected from the load in the front-rear direction at the time of a collision of the vehicle or the like.

(2) In the vehicle according to (1),
a center line (center line C) of the cable is positioned at a lower portion than the uppermost surface of the electric equipment.

According to (2), a protrusion of the cable in a height direction can be suppressed or reduced.

(3) In the vehicle according to (1) or (2),
the electric equipment includes a drive device (drive device 31) configured to accommodate an electric motor, and an electric motor control device (PCU 32) configured to control the electric motor, and
the drive device and the electric motor control device are arranged side by side in the width direction in a top view, and
the drive device and the electric motor control device are electrically connected to each other by an electrical connection portion (bus bar 35), and
facing surfaces (facing surfaces 31f, 32f) of the drive device and the electric motor control device face each other via a gap portion (gap portion S) in the width direction on a distal side farther away from a vehicle interior (vehicle interior 10) than the electrical connection portion in the front-rear direction, and
the cable connection portion is disposed on the facing surface (the facing surface 32f) of the electric motor control device in the gap portion.

According to (3), since the cable connection portion is disposed on the facing surface of the electric motor control device in the gap portion on the distal side farther away from the vehicle interior than the electrical connection portion, the cable connection portion is surrounded by a rigid body in three directions. As a result, damage at the time of a collision of the vehicle or the like can be avoided.

(4) In the vehicle according to (3),
the facing surface of the electric motor control device includes an inclined surface (inclined surface 32h) inclined downward toward the facing surface of the drive device,
the cable connection portion is disposed on the inclined surface, and
the first wire portion of the cable is connected to the cable connection portion from diagonally above.

According to (4), since the cable connection portion is disposed on the inclined surface formed on the facing surface of the drive device, the cable can be connected from diagonally above.

(5) In the vehicle according to (4), an upper surface of the drive device has a step portion (step portion 36) on the one side in the width direction, and the second wire portion is disposed at the step portion.

According to (5), the second wire portion is disposed at the step portion formed on the upper surface of the drive device, so that the protrusion of the cable in the height direction can be suppressed or reduced, and damage to the cable due to being in contact with peripheral devices or being pinched by peripheral devices at the time of a collision of the vehicle can be suppressed.

(6) In the vehicle according to any one of (1) to (5), the electric equipment is fixed to a sub-frame (sub-frame 54) having a rectangular shape so as to surround the electrical equipment via a first mounting portion (rear mounting portion 542), and the cable connection portion is disposed closer to the other side than the first mounting portion in the front-rear direction of the vehicle.

According to (6), since the cable connection portion of the electric equipment disposed on one side of the vehicle in the front-rear direction is disposed closer to the other side than the first mounting portion in the front-rear direction of the vehicle, the cable connection portion is protected by the first mounting portion when a load is input from one side where an influence on the electric equipment is relatively large.

(7) In the vehicle according to (6), the cable connection portion is disposed in a vicinity of the first mounting portion in the width direction.

According to (7), the cable connection portion is provided at a position close to the first mounting portion, so that a displacement of the cable connection portion at the time of turning of the vehicle is reduced, and a stress acting on the cable connection portion is reduced.

(8) In the vehicle according to (6) or (7), the electric equipment is fixed to the sub-frame via a pair of second mounting portions (front mounting portions 541) on a side opposite to the first mounting portion in the front-rear direction, and the third wire portion passes between the pair of second mounting portions.

According to (8), since the third wire portion of the cable is disposed in a space formed by the sub-frame and the pair of second mounting portions, the cable can be protected more reliably.

(9) In the vehicle according to (8), a cable protector (cable protector 85) is provided in the vicinity of the second mounting portions so as to cover at least a portion of the third wire portion from the sub-frame in a side view.

According to (9), a survival space of the cable can be secured by the cable protector at the time of a collision of the vehicle or the like.

(10) In the vehicle according to any one of (1) to (9), the cable extends in the front-rear direction across a virtual line (virtual line V) connecting suspension support portions (suspension support portions 6) supporting left and right suspension, and the electric equipment is disposed below a floor panel (floor panel 2) so as to be covered by the floor panel.

According to (10), even when the electric equipment is disposed below the floor panel, since the cable is disposed along the upper surface of the electric equipment, the cable can be protected from foreign matters such as flying stones and splashing water.

The invention claimed is:

1. A vehicle comprising:

an electric equipment; and a cable connected to the electric equipment, wherein a cable connection portion of the electric equipment is disposed on one side of the vehicle in a front-rear direction, wherein the cable connection portion is disposed at a position closer to the other side in the front-rear direction than an end surface on the one side in the front-rear direction of the electric equipment and lower than an uppermost surface of the electric equipment, wherein the cable includes, in a top view, a first wire portion extending from the cable connection portion to one side of the vehicle in a width direction of the vehicle, a second wire portion continuously extending from the first wire portion to the other side in the front-rear direction, and a third wire portion continuously extending from the second wire portion to the other side in the width direction, and wherein the cable is disposed along an upper surface of the electric equipment.

2. The vehicle according to claim 1, wherein a center line of the cable is positioned at a lower portion than the uppermost surface of the electric equipment.

3. The vehicle according to claim 1, wherein the electric equipment includes a drive device accommodating an electric motor, and an electric motor control device configured to control the electric motor, wherein the drive device and the electric motor control device are arranged in the width direction in a top view, wherein the drive device and the electric motor control device are electrically connected to each other by an electrical connection portion, wherein facing surfaces of the drive device and the electric motor control device face each other via a gap portion in the width direction on a distal side farther away from a vehicle interior than the electrical connection portion in the front-rear direction, and wherein the cable connection portion is disposed on the facing surface of the electric motor control device in the gap portion.

4. The vehicle according to claim 3, wherein the facing surface of the electric motor control device includes an inclined surface inclined downward toward the facing surface of the drive device, wherein the cable connection portion is disposed on the inclined surface, and wherein the first wire portion of the cable is connected to the cable connection portion from diagonally above.

5. The vehicle according to claim 4, wherein an upper surface of the drive device has a step portion on the one side in the width direction, and wherein the second wire portion is disposed at the step portion.

6. The vehicle according to claim 1, wherein the electric equipment is fixed to a sub-frame via a first mounting portion, the sub-frame having a rectangular shape so as to surround the electric equipment and wherein the cable connection portion is disposed closer to the other side than the first mounting portion in the front-rear direction of the vehicle.

7. The vehicle according to claim 6,
wherein the cable connection portion is disposed in a vicinity of the first mounting portion in the width direction.

8. The vehicle according to claim 6,
wherein the electric equipment is fixed to the sub-frame via a pair of second mounting portions on a side opposite to the first mounting portion in the front-rear direction, and
wherein the third wire portion passes between the pair of second mounting portions.

9. The vehicle according to claim 8,
wherein a cable protector is provided in a vicinity of the second mounting portions so as to cover at least a portion of the third wire portion from the sub-frame in a side view.

10. The vehicle according to of claim 1,
wherein the cable extends in the front-rear direction across a virtual line connecting left and right suspension support portions, and
wherein the electric equipment is disposed below a floor panel so as to be covered by the floor panel.

\* \* \* \* \*